Figure 3:
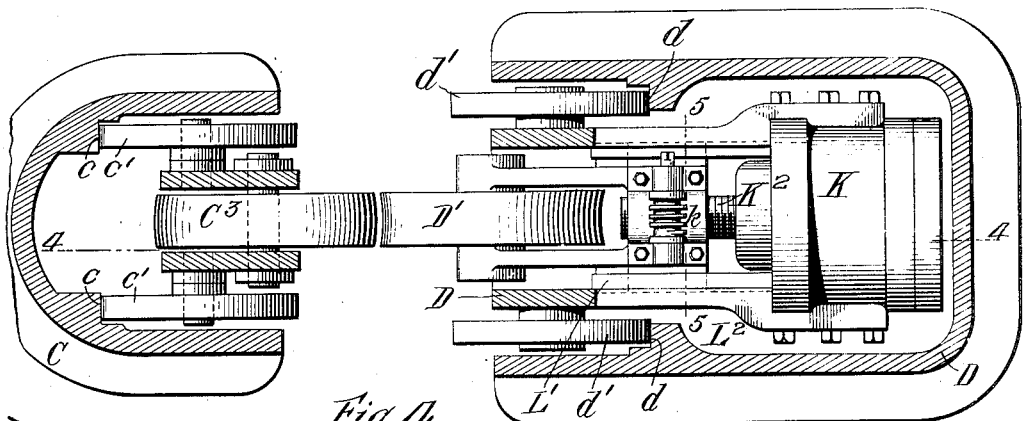

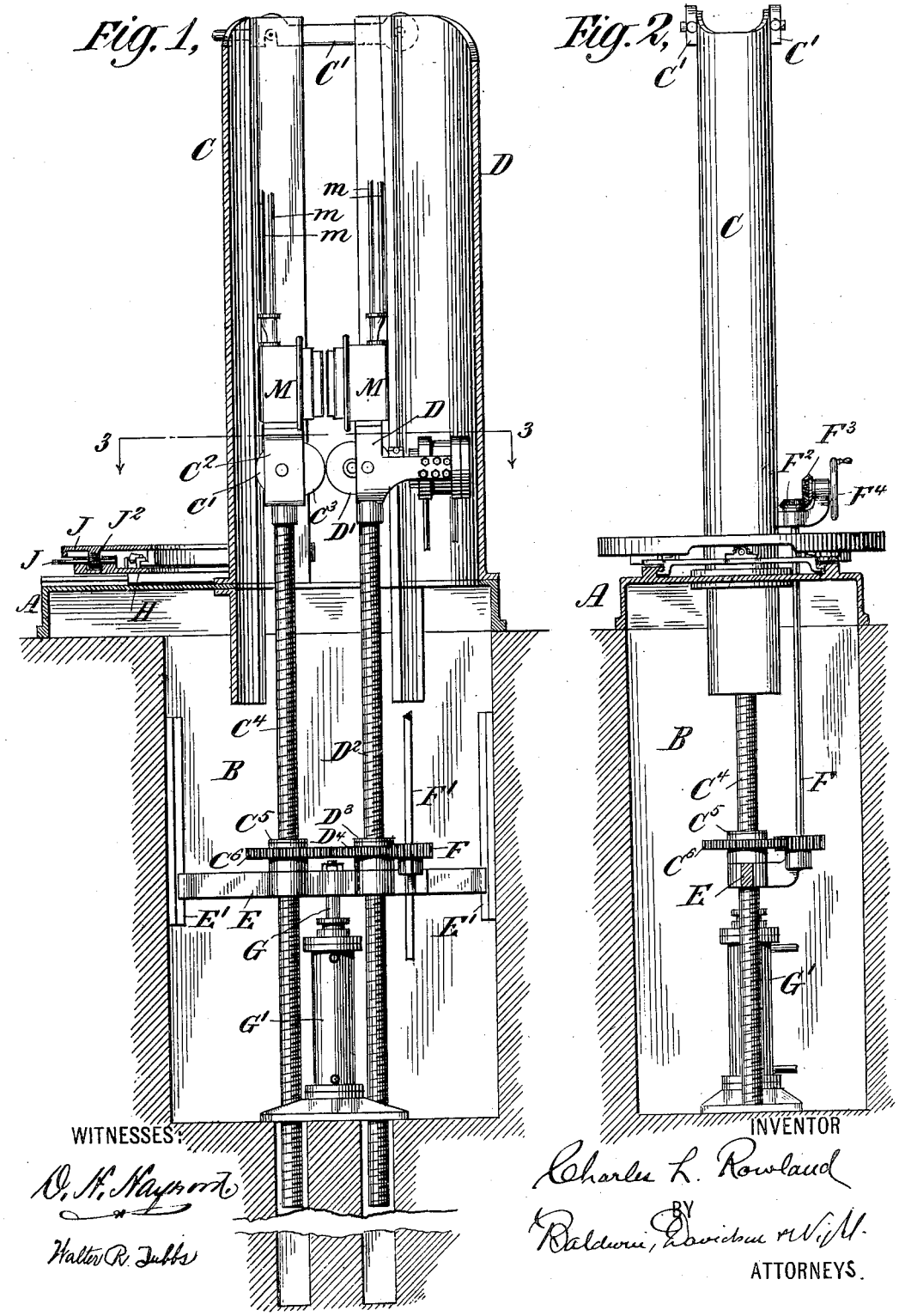

No. 817,992.

PATENTED APR. 17, 1906.

C. L. ROWLAND.
WELDING APPARATUS.
APPLICATION FILED FEB. 12, 1898.

4 SHEETS—SHEET 2.

Witnesses:
Paul J. Gathmann
E. B. Burrer

Inventor:
Charles L. Rowland
By his Attorneys:
Baldwin Davidson Wight

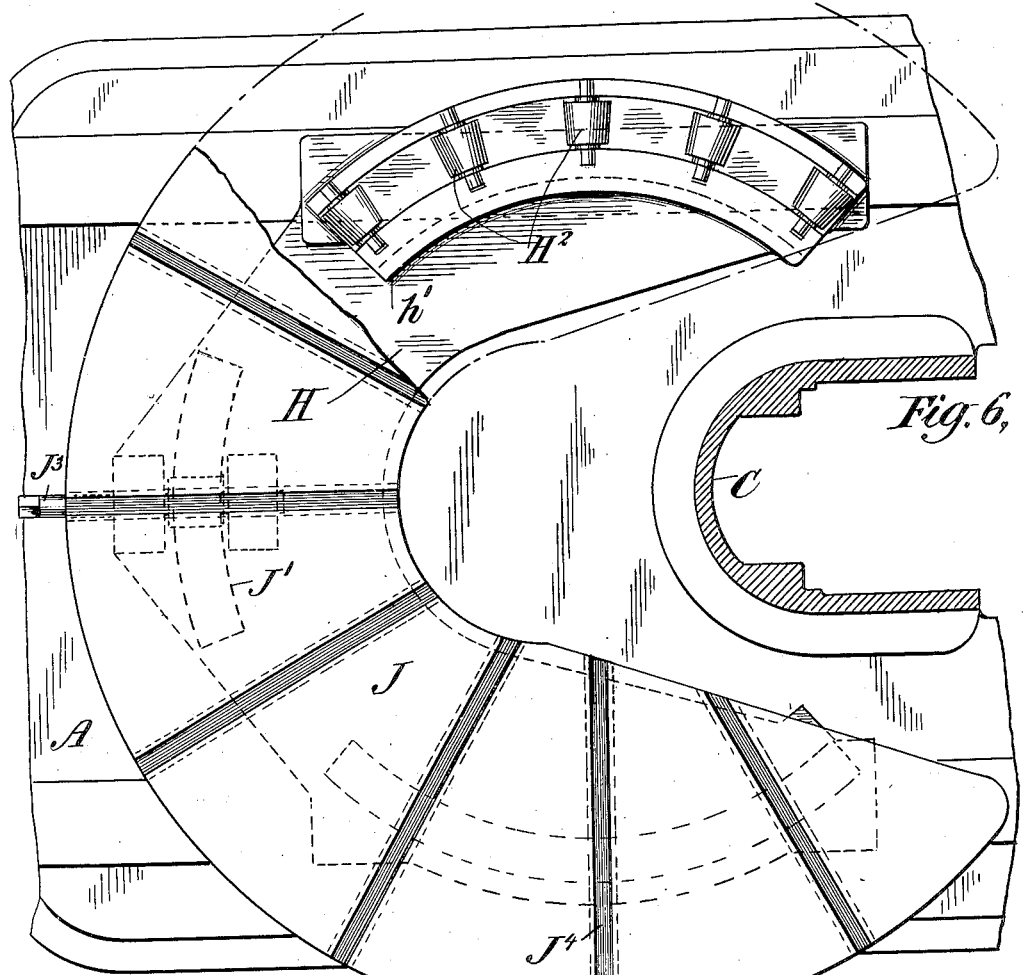
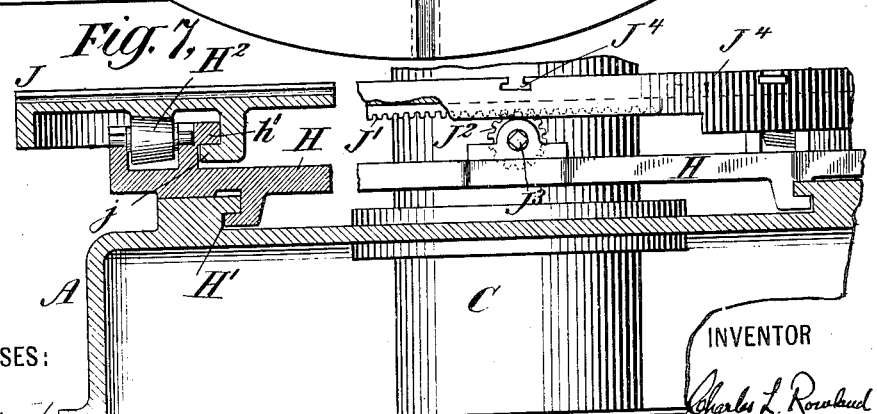

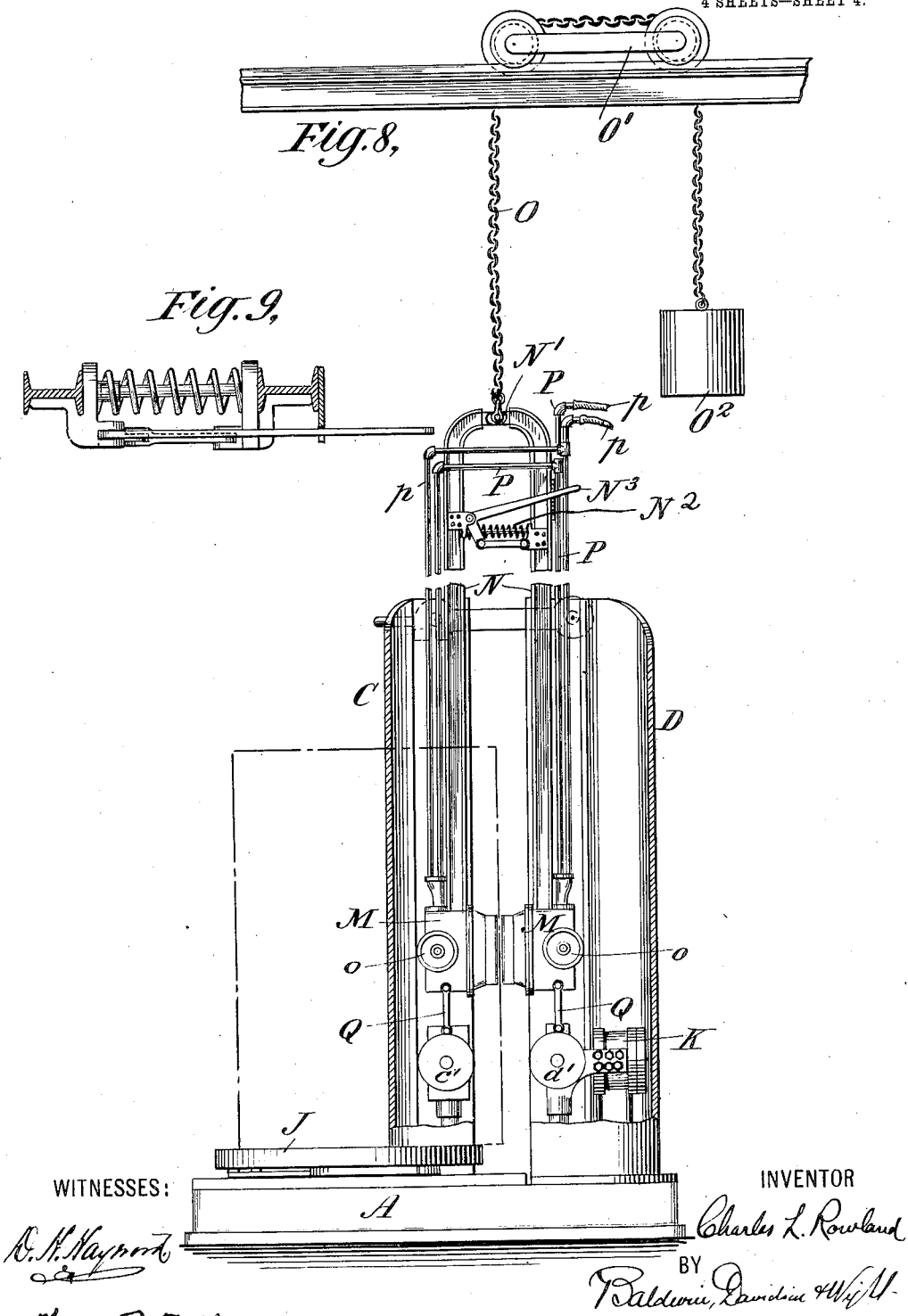

UNITED STATES PATENT OFFICE.

CHARLES L. ROWLAND, OF BROOKLYN, NEW YORK.

WELDING APPARATUS.

No. 817,992. Specification of Letters Patent. Patented April 17, 1906.

Application filed February 12, 1898. Serial No. 670,131.

*To all whom it may concern:*

Be it known that I, CHARLES L. ROWLAND, a citizen of the United States, residing in the borough of Brooklyn, city of New York, State of New York, have invented certain new and useful Improvements in Welding Apparatus, of which the following is a specification.

This invention relates specially to apparatus for welding cylinder-seams. Its object is particularly to provide a vertical cylinder-welding apparatus in which the cylinder being operated upon has no vertical movement and in which the welding and heating devices are reciprocated over or along successive lengths of the seam to be welded until the entire seam has been operated upon.

The cylinder support or table is so constructed and mounted that it may be moved in a horizontal right line to bring the seams of cylinders of varying diameters in the proper vertical plane with reference to the welding devices and may be adjusted about a center to circumferentially adjust the cylinders relatively to the welding devices.

My improved organization comprehends an arrangement wherein the frame supporting the welding devices may at the will of the operator be raised or lowered any desired distance, and when set or brought into the desired position the welding devices may be reciprocated through the desired distance or stroke to effect the welding of the seam, after which the frame and welding devices are again moved and the welding devices again reciprocated to operate upon the new length of the seam thus brought into the sphere of their operation. With such an organization the parallel frames between which the welding devices travel and against which the strain of the welding operation is exerted laterally may be tied or locked together at the ends to sustain them against such lateral strains. One or both of the welding devices, though preferably one only, are pressed against the seam by power, preferably furnished by a cylinder, (steam, hydraulic, or compressed air, &c.,) and the organization is such that the piston-rod of such a cylinder may at will be lengthened or shortened to adapt the devices to receive between them different thicknesses of metal to be welded.

The various features of novelty of my improved organization are hereinafter described and claimed.

I am aware that heretofore vertically-arranged cylinder-welding apparatus has been proposed in which the welding devices are stationary and the support carrying the cylinder is reciprocated vertically. In such organizations the expenditure of considerable energy is required to raise and reciprocate the support and cylinder, which are relatively of great weight, the movement of the support during the greater part of the work of welding a seam is out of the convenient reach and control of the workman unless the workman rides upon the cylinder-support, which adds to the load to be moved up and down. There are difficulties in attempting to adjust the reciprocating blank or cylinder being operated upon circumferentially while it is being acted upon by the welding devices, and since the cylinder is movable and the welding devices stationary it is necessary to leave an open passage between the parallel frames carrying the welding devices for the travel of the cylinder, and hence it is impossible to tie such frames together at their ends to brace them against lateral strains of the welding devices, (unless the frames are made inordinately long—say somewhat greater in length than twice the length of the longest cylinder to be welded—which would be impracticable and expensive,) and hence the frames must be made of great strength and weight, and even when considerable provision of this kind is made there is danger of the frames being broken or strained by the laterally-exerted welding strains.

In Letters Patent of the United States of America No. 598,960, granted to me February 15, 1898, I have shown and claimed a machine in some respects resembling that herein disclosed, but differing therefrom in material respects, as will hereinafter more fully appear.

Figure 4:
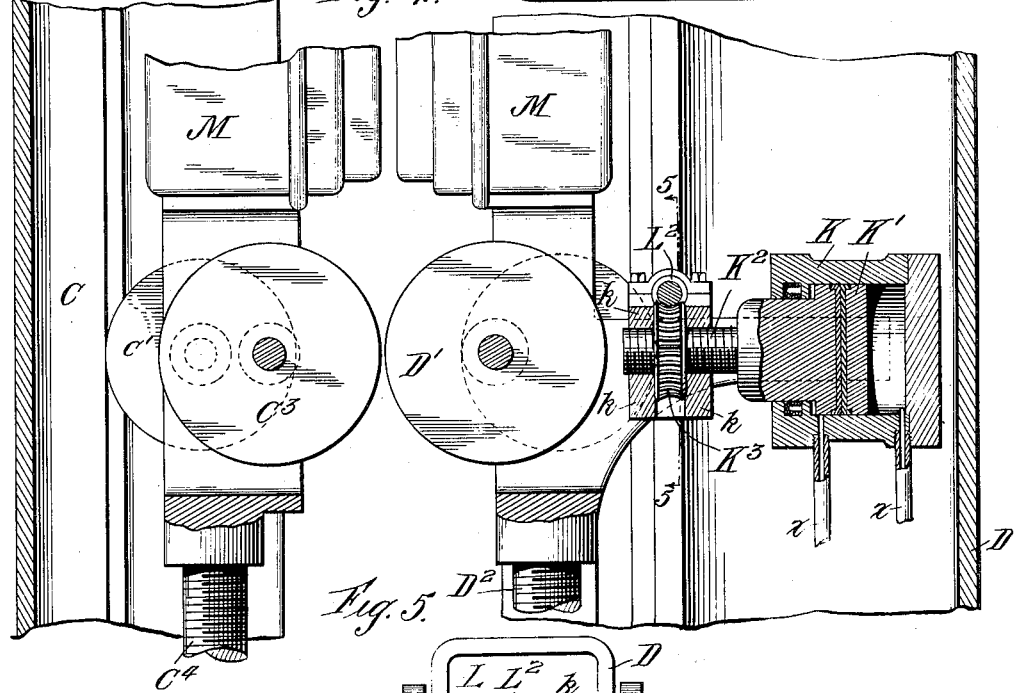
Figure 5:
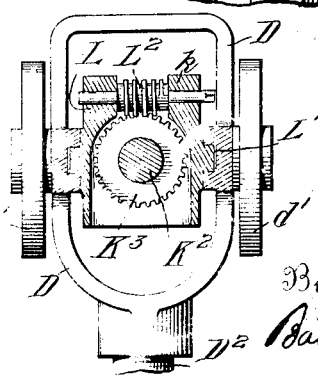

In the accompanying drawings, Figure is 1 a vertical longitudinal sectional view of my improved organization; Fig. 2, a view at right angles thereto, partly in section and partly in elevation; Fig. 3, an enlarged horizontal section on the line 3 3 of Fig. 1; Fig. 4, an enlarged sectional view on the line 4 4 of Fig. 3; Fig. 5, a section on the line 5 5 of Fig. 3; Fig. 6, a view, partly in plan and section, showing the clyinder-support; Fig. 7, a view, partly in section and elevation, of the parts shown in Fig. 6; Fig. 8, an elevation, partly in section, showing another way of mounting and carrying the heating-furnaces;

and Fig. 9 a detail view showing the hinge connection of the bars carrying the heating-furnaces.

The apparatus may be set up as indicated in Figs. 1 and 2—that is to say, there is a base A arranged at or about the floor-level and covering a pit B. On the base are mounted two vertical stationary parallel frames C D, which may be braced or tied together at their upper ends by locks, bars, or latches C'. These parallel frames or columns may be U-shaped in cross-section and may be of the shape indicated in sectional view, Figs. 3 and 6.

The frame C is provided with vertical tracks $c\,c$, and the frame D is provided with vertical tracks $d\,d$. The welding device may be of any suitable character, though rolls are shown and are preferably employed. One welding-roll carriage $C^2$ is equipped with wheels $c'\,c'$, that run upon the tracks $c\,c$, and carries the welding-roll $C^3$. The other welding-roll carriage D is equipped with wheels $d'\,d'$, that run upon the tracks $d\,d$ of the frame or column D, and carries a welding-roll D'. As seen in Fig. 3, the periphery of one welding-roll $C^3$ is preferably slightly convex, while that of the other welding-roll D' is correspondingly concave. The welding-roll D' is forced against the seam to be welded and is adjustably mounted, as hereinafter described.

The carriage $C^2$ is mounted upon the upper end of the vertical screw-threaded rod $C^4$, while carriage D is similarly mounted upon a screw-threaded rod $D^2$. The screw-threaded rod $C^4$ passes through a correspondingly-threaded nut $C^5$, formed with a gear-wheel $C^6$ and turning in a bearing in a cross-frame E. The rod $D^2$ similarly passes through an internally-threaded nut $D^3$, formed with a gear $D^4$ and also turning in a bearing in the cross-frame E. The two gears $C^6$ and $D^4$ mesh, and the cross-frame E is vertically movable in guides or ways E' E', attached to opposite walls of the pit. A pinion F meshes with the gear $D^4$ and is formed with a hub, which also turns in bearings in the cross-frame E. A vertical rod F', angular in cross-section, slides freely in a corresponding aperture through the hub of the pinion F and extends upwardly through the platform A, where it is equipped with a beveled pinion $F^2$, gearing with a corresponding beveled pinion $F^3$ on a short shaft provided with a hand-wheel $F^4$. It is therefore apparent that the internally-threaded nuts $C^5$ and $D^3$ may be rotated and the screw-threaded rods $C^4$ and $D^2$ raised or lowered, correspondingly raising or lowering the welding devices carried upon their upper ends. The welding devices may therefore be set at any desired position or elevation between the parallel frames C D. When so set, they may be reciprocated by a piston-rod G, attached to the cross-frame E and to the piston of a power-cylinder G', that may be supplied with steam, compressed air, water under pressure, &c. The support for the cylinder whose seam is to be welded is shown in detail in Figs. 6 and 7. It is composed of a table H, sliding in straight ways H', formed in or upon the platform A. The table H is provided with internally-projecting segmental flanges h' on opposite sides, and the carriage or cylinder support proper, J, is formed with segmental flanges $j$, corresponding to and fitting under the flanges h' of the table H. The part J may therefore be adjusted circularly with reference to the table H, and this may be conveniently accomplished by forming a segmental rack J' on the under side of the part J and with which engages a pinion $J^2$ on a shaft $J^3$, turning in bearings in lugs on the platform H. By applying a key to the squared end of this shaft the carriage J may be partially rotated, and to reduce friction I support the carriage upon rolls $H^2$, mounted in bearings on the table H. With this organization it is apparent that when a cylinder is placed upon its end on the carriage J the cylinder-support, consisting of the parts H J, may be moved in or out with reference to the column C to bring the seam to be welded properly in line of travel of the welding devices, and that the cylinder may be circumferentially adjusted to vary the relation of the seam to the welding devices. Undercut or dovetailed grooves $J^4$ may be formed in the face of the carriage J for the reception of correspondingly-shaped clamps provided with bolts, by which the cylinder may be gripped and held in position. These devices are old in this class of apparatus and illustration of them or further description is unnecessary.

The welding roll or device D' is capable of being pressed against the seam to be welded by a power device—such, for instance, as the cylinder K—which may be supplied with steam, compressed air, water under pressure, &c. The piston K' is provided with a screw-threaded piston-rod $K^2$, that passes through a correspondingly-threaded worm-wheel $K^3$, fitting closely between jaws or abutment-blocks $k\,k$, forming part of a sliding frame L, movable horizontally in ways L' in the welding-device carriage D. A worm $L^2$, turning in bearings in the sliding frame L, engages the worm-wheel. By applying a key to the squared end of the worm-shaft the worm-wheel may be rotated to, in effect, shorten or lengthen the piston. This adjustment is desirable to adapt the welding devices to receive between them different thicknesses of metal to be welded, and whatever the adjustment may be the welding device D' is forced against the seam to be welded by power exerted in the cylinder K. This organization is one in which the connection between the welding devices and the power device, which presses it against the seam to be welded, may be lengthened or shortened, and the adjustment is made in the axial line in which the power is transmitted to the welding device. Other organizations than that shown embodying this principle of construction and operation may of course be adopted without departing from my invention.

The cylinder K is supplied with steam or other suitable medium under pressure by flexible pipes x x, which permit the travel of the cylinder with the welding devices. So far as I know an organization in which the traveling or reciprocating welding devices are provided with a power device to force one or both of them against the seam to be welded and which travels with them is new with me, and it constitutes a feature of my invention.

In the organization shown in Figs. 1 and 4 the opposed heating-furnaces M M are mounted directly upon and carried by the carriages of the welding devices and are supplied by air and gas or other suitable fuel by flexible or telescoping pipe connections m m. In Fig. 8, however, I have shown a different organization, in which the furnaces M M are carried at the lower ends of bars N N, connected by a hinged joint at N' and suspended by a chain O, running over pulleys on a truck O', traveling on an overhead way or track and having attached to it a counterweight $O^2$. The furnaces are provided with wheels o, that travel upon the tracks c c and d d of the vertical parallel frames or columns C D and are fed with fuel through pipes P, to the ends of which are attached flexible supply-pipes p p. A spring $N^2$ is placed between the bars N and normally tends to press them apart to move the opposed furnaces away from each other, and by a lever-and-link connection $N^3$ the bars may be drawn together against the pressure of the spring and so held. The purpose of this arrangement is to permit of the separation of the furnaces while the cylinder is being placed in position and of their being drawn closely against the seam to be welded when the cylinder being operated upon has been properly set and adjusted. By raising and lowering the bars and furnaces they may be moved in correspondence with the welding devices, as is well understood. This organization is such that in the event of the furnaces requiring repair they may readily be withdrawn and a duplicate set substituted, thus avoiding any prolonged stoppage of the welding apparatus. In order that the furnaces may closely follow the movements of the welding devices, I prefer to connect the carriages of the welding devices and the furnaces by links Q, which may be detached by the removal of either of the bolts that connect them to the furnaces and welding-device carriages, respectively. In operating this form of my invention I may, and prefer to do so, carry the counterbalancing of the furnaces to the point of overbalancing them, so as to carry part of the weight of the welding devices, their threaded supporting-rods, and carriage E. By so doing the power required to raise and lower the furnaces by the manipulation of the hand-wheel $F^4$ or other device may be greatly reduced, as may also the power required from the cylinder G', which reciprocates the welding devices.

Welding apparatus constructed in accordance with this invention comprises an organization by which movable welding devices are caused to act throughout the length of the seam of a cylinder held against axial endwise movement, and one of the welding devices is acted upon by a power device, shown as a fluid-pressure cylinder, which travels with it. This is believed to be novel and of great utility. Moreover, the heating-furnaces are moved along the seam with the welding devices, and the two members of the frame in which the welding devices run are locked together at their outer ends to resist outward strains.

I claim as my invention—

1. In a cylinder-welding apparatus the combination of the stationary parallel frames, opposed welding devices running thereon, a frame carrying the welding devices, mechanism for adjusting the frame and welding devices relatively to the parallel frames to bring the welding devices into proper relation to a fresh or unwelded part of the seam, and mechanism for reciprocating the welding devices throughout a limited length of the seam in any position to which they may be so adjusted, substantially as set forth.

2. In a cylinder-welding apparatus the combination of the stationary parallel frames, opposed welding devices running thereon, a frame carrying the welding devices, mechanism for adjusting the frame and welding devices relatively to the parallel frames to bring the welding devices into proper relation to a fresh or unwelded part of the seam, mechanism for reciprocating the welding devices throughout a limited length of the seam in any position to which they may be so adjusted, and a cylinder-support immovable in line with the axis of the cylinder but adjustable transversely thereto, substantially as set forth.

3. In a cylinder-welding apparatus the combination of the stationary parallel frames, opposed welding devices running thereon, a frame carrying the welding devices, mechanism for adjusting the frame and welding devices relatively to the parallel frames to bring the welding devices into proper relation to a fresh or unwelded part of the seam, mechanism for reciprocating the welding devices throughout a limited length of the seam in any position to which they may be so adjusted, and a cylinder-support immovable in line with the axis of the cylinder, but adjustable transversely thereto about a center and in a right line, substantially as set forth.

4. In a cylinder-welding apparatus the combination of the stationary parallel frames, opposed welding devices and heating-furnaces traveling between the stationary frames, a frame carrying the welding devices, mechanism for adjusting the frame, welding devices and furnaces relatively to the parallel frames to bring the welding devices into proper relation to a fresh or unwelded part of the seam, and mechanism for reciprocating the welding devices throughout a limited length of the seam in any position to which they may be so adjusted, substantially as set forth.

5. In a cylinder-welding apparatus the combination of the stationary parallel frames, opposed welding devices and heating-furnaces traveling between the stationary frames, a frame carrying the welding devices, mechanism for adjusting the frame, welding devices and furnaces relatively to the parallel frames to bring the welding devices into proper relation to a fresh or unwelded part of the seam, and mechanism for reciprocating the welding devices and furnaces throughout a limited length of the seam in any position to which they may be adjusted, substantially as set forth.

6. In a cylinder-welding apparatus the combination of the vertical parallel frames, a cylinder-support non-adjustable in line with the axis of the cylinder and adapted to support the cylinder to be welded in a vertical position, opposed welding devices working between the parallel frames, mechanism for reciprocating the welding devices throughout the length of the seam to be welded, opposed furnaces suspended between the parallel frames and capable of being moved in correspondence with the welding devices, substantially as set forth.

7. In a cylinder-welding apparatus the combination of the vertical parallel frames, opposed welding devices working between the parallel frames, mechanism for reciprocating the welding devices throughout the length of the seam to be welded, opposed furnaces suspended between the parallel frames, coupled to the carriages of the welding devices and reciprocating therewith, substantially as set forth.

8. In a cylinder-welding apparatus the combination of the vertical parallel frames, opposed welding devices working between the parallel frames, mechanism for reciprocating the welding devices throughout the length of the seam to be welded, opposed furnaces counterbalanced and suspended between the parallel frames and capable of being moved in correspondence with the welding devices, substantially as set forth.

9. In a cylinder-welding apparatus the combination of the vertical parallel frames, opposed welding devices working between the parallel frames, mechanism for reciprocating the welding devices throughout the length of the seam to be welded, opposed furnaces counterbalanced and suspended between the parallel frames, coupled to the carriages of the welding devices and reciprocating therewith, substantially as set forth.

10. In a cylinder-welding apparatus the combination of the vertical parallel frames, a cylinder-support non-adjustable in line with the axis of the cylinder and adapted to support the cylinder to be welded in a vertical position, opposed welding devices working between them, mechanism for reciprocating the welding devices throughout the seam to be welded, the opposed furnaces, their suspended supporting-bars, the hinge connection between said bars and means for swinging the bars on their hinge connection, substantially as set forth.

11. In a cylinder-welding apparatus the combination of the vertical parallel frames, a cylinder-support non-adjustable in line with the axis of the cylinder and adapted to support the cylinder to be welded in a vertical position, opposed welding devices working between them, mechanism for reciprocating the welding devices throughout the seam to be welded, the opposed furnaces, their suspended supporting-bars, the hinge connection between said bars, means for at will automatically swinging the bars on their hinge connection, to separate the furnaces, substantially as set forth.

12. In a cylinder-welding apparatus the combination of the parallel frames, the opposed welding devices, means for reciprocating them between the frames and along the seam to be welded, a power-cylinder traveling with the welding devices for forcing one of the welding devices up to its work, and means for lengthening or shortening the connection between the piston of the cylinder and the welding device, substantially as set forth.

13. In a cylinder-welding apparatus the combination of vertical parallel frames, opposed welding devices between them, their adjustable carrying-frame and means for reciprocating them, the counterbalanced furnaces, and connections between the w lding devices and furnaces, substantially as set forth.

14. In a cylinder-welding apparatus the combination of a support for positively holding the cylinder in its fixed position, welding devices, one on each side of the seam to be welded, mechanism for adjusting both welding devices at intervals along the seam to be welded and mechanism for reciprocating the welding devices along the seam in each position to which they may be moved.

15. In a cylinder-welding apparatus the combination of the parallel frames, opposed welding devices located between the frames, mechanism for adjusting the welding devices at intervals along the seam to be welded, and other mechanism for forcing one welding device against the seam to be welded in each position to which they may be moved.

16. In a cylinder-welding apparatus the combination of the vertical parallel frames, an adjustable cylinder-support adapted to support the cylinder in a vertical position, opposed welding devices located between the frames, mechanism for adjusting the welding devices intermittently along the seam to be welded and other mechanism for forcing one welding device against the seam to be welded in each position to which they may be moved.

17. In a cylinder-welding apparatus the combination of opposed reciprocable welding devices, means for supporting a cylinder with the seam to be welded between said devices, means for adjusting the reciprocable welding devices to different positions along the seam, whereby different parts of the seam are successively subjected to the action of the reciprocable intermittently-adjustable welding devices and heating-furnaces, one on each side of the seam, adapted to be moved along the entire length of the seam.

18. In a cylinder-welding apparatus the combination of a support for positively holding the cylinder in position, welding devices, one on each side of the seam to be welded, means whereby the welding devices may be reciprocated along the entire seam, heating-furnaces, one on each side of the seam, adapted to be moved along the entire seam, and means for circumferentially adjusting the cylinder-support.

In testimony whereof I have hereunto subscribed my name.

CHARLES L. ROWLAND.

Witnesses:
FRANK S. OBER,
EDWARD C. DAVIDSON.